(12) United States Patent
Rodzevski et al.

(10) Patent No.: US 9,712,256 B2
(45) Date of Patent: Jul. 18, 2017

(54) METHOD AND SYSTEM FOR CAPTURING MEDIA BY USING BAN

(71) Applicant: Sony Corporation, Tokyo (JP)

(72) Inventors: Aleksandar Rodzevski, Malmo (SE); Ola Thorn, Limhamn (SE); Erik Bengtsson, Eslov (SE); Malin Larsson, Malmo (SE); Thomas Bolin, Lund (SE); Kristian Tarnhed, Lund (SE); Henrik Bengtsson, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/612,693

(22) Filed: Feb. 3, 2015

(65) Prior Publication Data

US 2016/0226599 A1   Aug. 4, 2016

(51) Int. Cl.

| | |
|---|---|
| H04B 7/00 | (2006.01) |
| H04B 13/00 | (2006.01) |
| H04M 1/725 | (2006.01) |
| H04W 4/00 | (2009.01) |
| H04W 8/24 | (2009.01) |

(52) U.S. Cl.
CPC ........ *H04B 13/005* (2013.01); *H04M 1/7253* (2013.01); *H04W 4/008* (2013.01); *H04W 8/24* (2013.01)

(58) Field of Classification Search
CPC .. H04W 12/06; H04M 1/7253; H04L 63/0861
USPC ...................... 455/41.1, 41.2, 41.3
See application file for complete search history.

(56) References Cited

U.S. PATENT DOCUMENTS

| | | |
|---|---|---|
| 6,580,356 B1 | 6/2003 | Alt et al. |
| 7,202,773 B1 | 4/2007 | Oba et al. |
| 8,763,058 B2 * | 6/2014 | Omernick .......... H04N 21/2402 715/764 |
| 2005/0008148 A1 | 1/2005 | Jacobson |
| 2005/0243061 A1 | 11/2005 | Liberty et al. |

(Continued)

FOREIGN PATENT DOCUMENTS

| | | |
|---|---|---|
| EP | 2018038 | 1/2009 |
| EP | 2378748 | 10/2011 |

(Continued)

OTHER PUBLICATIONS

Wearable Key: Device for personalizing nearby environment. IEEE-2000. Auther-Nobuyuki Matsushita.*

(Continued)

*Primary Examiner* — Md Talukder
(74) *Attorney, Agent, or Firm* — Renner, Otto, Boisselle & Sklar, LLP (57) ABSTRACT

A method and system for capturing media data using an Body Area Network, BAN, wherein the BAN comprises a BAN enabled media capturing device associated with a first user and at least one BAN enabled communication device associated with a second user, wherein a BAN link is established through the body of the second user between the capturing device and the communication device, when the second user touches the capturing device, settings, related to capturing media data and related to said second user, are downloaded to the capturing device by using the established BAN link and media data is captured with the capturing device by using the downloaded settings wherein the capturing is triggered by the second user.

20 Claims, 6 Drawing Sheets

(56) References Cited

U.S. PATENT DOCUMENTS

| | | |
|---|---|---|
| 2007/0145119 A1 | 6/2007 | Rhelimi |
| 2007/0242613 A1* | 10/2007 | Shigetoshi .......... H04L 43/0805 370/244 |
| 2007/0282783 A1 | 12/2007 | Singh |
| 2008/0259043 A1* | 10/2008 | Buil ...................... H04B 13/005 345/173 |
| 2008/0298389 A1* | 12/2008 | Nagaike ............... H04B 13/005 370/468 |
| 2009/0021591 A1* | 1/2009 | Sako .................. H04N 1/00339 348/211.2 |
| 2009/0023391 A1* | 1/2009 | Falck ................... A61B 5/0024 455/41.2 |
| 2009/0070472 A1* | 3/2009 | Baldus ................. A61B 5/0028 709/227 |
| 2009/0094681 A1 | 4/2009 | Sadler et al. |
| 2009/0264712 A1* | 10/2009 | Baldus ................. A61B 5/0002 600/300 |
| 2010/0277435 A1 | 11/2010 | Han et al. |
| 2011/0205156 A1 | 8/2011 | Gomez et al. |
| 2012/0026129 A1 | 2/2012 | Kawakami |
| 2012/0088446 A1* | 4/2012 | Fyke ...................... H04K 3/415 455/1 |
| 2012/0133605 A1* | 5/2012 | Tanaka ................. H04B 13/005 345/173 |
| 2012/0249409 A1 | 10/2012 | Toney et al. |
| 2012/0322461 A1* | 12/2012 | Ito .......................... G06F 21/35 455/456.1 |
| 2012/0324368 A1 | 12/2012 | Putz et al. |
| 2013/0017789 A1 | 1/2013 | Chi et al. |
| 2013/0174049 A1 | 7/2013 | Townsend et al. |
| 2014/0085050 A1 | 3/2014 | Luna |
| 2014/0184555 A1* | 7/2014 | Pi .......................... G08C 17/06 345/174 |
| 2014/0194140 A1* | 7/2014 | Takano ................. H04W 4/043 455/456.1 |
| 2014/0300490 A1* | 10/2014 | Kotz .................... A61B 5/0028 340/870.3 |
| 2014/0325614 A1* | 10/2014 | Rhelimi ................ H04W 12/06 726/4 |
| 2015/0162994 A1* | 6/2015 | Rodzevski ......... G07C 9/00309 455/39 |
| 2015/0163221 A1* | 6/2015 | Bolin ................. G07C 9/00309 726/7 |
| 2016/0028492 A1* | 1/2016 | Triantafillou ......... H04W 84/18 726/3 |
| 2016/0226599 A1* | 8/2016 | Rodzevski ........... H04B 13/005 |

FOREIGN PATENT DOCUMENTS

| | | |
|---|---|---|
| EP | 2600319 | 6/2013 |
| JP | 2008 073462 | 4/2008 |
| JP | 2009 049951 | 3/2009 |
| WO | 2011/021531 | 2/2011 |

OTHER PUBLICATIONS

Bionym, "The Nymi White Paper", Nov. 19, 2013.

Matsushita et al.; "Wearable Key: Device for Personalizing Nearby Environment"; The Fourth Symposium on Atlanta, GA, USA; Oct. 16-17, 2000; Los Alamitos, CA, USA; IEEE Comput. Soc., US, Oct. 16, 2000; pp. 119-126.

"What you touch is yours; SMARTBAN (13)001011_eGO_project"; ETSI Draft; SMARTBAN (13)001011 EGO Project, European Telecommunications Standards Institute (ETSI); vol. SMARTBAN; May 28, 2013; pp. 1-19.

Oh et al.; "Personal Environment Service Based on the Integration of Mobile Communications and Wireless Personal Area Networks"; IEEE Communications Magazine; vol. 48, No. 6; Jun. 1, 2010; pp. 66-72.

International Search Report for corresponding application PCT/IB2015/055312, mailed Dec. 4, 2015.

* cited by examiner

METHOD AND SYSTEM FOR CAPTURING MEDIA BY USING BAN

TECHNICAL FIELD

The present disclosure relates in general to the field of wireless communication devices, and particularly to communication devices, such as smart phones or tablet, configured for both wireless and Body Coupled Communication, BCC, with at least one further portable electronic communication device, such as a watch or a wristlet, worn by a user, creating a system in a Body Area Network, BAN. The present invention relates to a system and a method for capturing media data by using BAN.

BACKGROUND ART

There is an emerging consumer market for certain devices that are used as companion products to wireless communication devices. Their popularity can be traced, in part, to the variety of features they provide to a user. For example, one such device is a wearable device, such as a ring worn on the user's finger, a necklace, glasses, a wristlet e.g. a watch or wristband that is worn around a user's wrist or in the body of a user. Typically, such wearable devices may provide different features, such as a logging function that monitors the user's motion and resting activities, and then sends a report on the detected motion and activities to the user's smartphone for storage in memory. Another feature allows the wearable devices to be used as a personal token to automatically gain access to a smartphone that has been locked.

Conventional wireless communication devices are generally connected to each other or is connected by utilizing different kinds of short range wireless solutions, also referred to as Personal Area Network, PAN using radio-frequency (RF) techniques such as Bluetooth©, infrared Data association (IrDA), ZigBee©, Ultra Wideband (UWB), etc. However, the RF-technique have some drawbacks, e.g. there might be a limited operating time due to relatively high power consumption of the RF transceiver, the risk of interference with other RF systems operating in the same frequency band, and the user is exposed to potentially harmful RF radiation. Moreover, the user needs to manually pair the internet enabled devices, e.g. a camera with a mobile phone, in order to establish a RF connection between them.

Sharing files, images or any other information on the internet is ultra-simple today. Sharing offers low control, and does not allow the spontaneous simple sharing that we are used to with physical things. It is today possible to pick up a device with a camera function, e.g. a smartphone, tablet or the like, belonging to a stranger and take a picture. However if we like to store or transfer the pictures to our account, we need to log on to our account were we keep our pictures. The disadvantage is that our login information will be stored at the stranger's device, thus it is a security problem. A known solution to this problem is that some devices have biometric sensing capabilities e.g. fingerprint scanning. The disadvantage with this solution is that there is a risk of spoofing and there is increased cost due to adding a fingerprint scanner which is unrealistic for most devices. Another known solution is to use password login, which is industry standard, but is inconvenient, takes time, and is sensitive to ease dropping.

Thus, there is a need for a simple, easier and more intuitive and secure ways of capturing images or other information by using another person's device by means of easy and convenient methods.

SUMMARY OF THE INVENTION

An object of the present disclosure is to provide a solution which seeks to mitigate, alleviate, or eliminate one or more of the above and below identified deficiencies in the art and disadvantages singly or in any combination.

An aspect of the present invention relates to a method for capturing media data using a Body Area Network, BAN, wherein said BAN comprises a BAN enabled media capturing device associated with a first user and at least one BAN enabled communication device associated with a second user. The method comprises establishing a BAN link through the body of the second user between the capturing device and the communication device, when the second user touches the capturing device, downloading settings, related to capturing media data and related to the second user, to the capturing device by using the established BAN link and capturing media data with the capturing device by using the downloaded settings wherein the capturing is triggered by the second user. In one aspect the method comprises transmitting the captured media data from the capturing device to the communication device by using a communication network. In one aspect the downloaded settings comprises media capture history related to the second user.

In one aspect, the media data is any of an image, a film, sound or a combination thereof. In one aspect the method comprising downloading a media capturing application to the media capturing device by using a communication network and capturing said media data by activating an instance of said capturing application.

In one aspect the method comprises adding metadata to the captured media data. In one example the metadata comprises identification information of the second user or security information. In example the metadata comprises any of time, location or a combination thereof.

In one aspect the method comprises setting restriction of access to the capturing device.

An aspect of the present invention relates to a system for capturing media data using a Body Area Network, BAN, wherein the system comprises a BAN enabled media capturing device associated with a first user and at least one BAN enabled communication device associated with a second user. The media capturing device comprises a processing circuitry configured to establishing a BAN link through the body of the second user between the capturing device and the communication device, when the second user touches the capturing device and downloading settings, related to capturing media data and related to the second user, to the capturing device by using said established BAN link, a media capturing unit configured to capturing media data by using the downloaded settings wherein the capturing is triggered by the second user. The communication device comprises a processing circuitry configured to establishing the BAN link through the body of the second user between the communication device and the capturing device, when the second user touches the capturing device and transmitting settings, related to capturing media data and related to the second user, to the capturing device by using the established BAN link.

In one aspect the processing circuitry of the capturing device is configured to transmit the captured media data from the capturing device to the communication device by using a communication network. In one aspect, the processing circuitry of the capturing device is configured to downloading a media capturing application to the media capturing device by using a communication network and the media capturing unit is configured to capturing the media data by using the capturing application. In one aspect the processing circuitry of the capturing device is configured to adding metadata to the captured media data.

The features of the above-mentioned embodiments can be combined in any combinations.

BRIEF DESCRIPTION OF THE DRAWINGS

Further objects, features and advantages of the present invention will appear from the following detailed description of the invention, wherein embodiments of the invention will be described in more detail with reference to the accompanying drawings, in which.

DETAILED DESCRIPTION

Aspects of the present invention will be described more fully hereinafter with reference to the accompanying drawings. The devices and methods disclosed herein can, however, be realized in many different forms and should not be construed as limited to aspects set forth herein. Like reference signs refer to like elements throughout the text.

As used herein, the term "mobile device" includes mobile communication device and mobile radio communication equipment. Portable communication devices and mobile communication devices may be used synonymously. The term "mobile device" may be referred to below as a mobile phone (or as a mobile telephone, portable phone or portable telephone), a portable device, a portable radio terminal or a portable terminal, which includes all electronic equipment, but not limited to, capable of being used for voice and/or data communication.

As will be appreciated, the invention may be used with mobile phones, other phones, smartphones, personal digital assistants (PDAs), computers, tablets, other electronic communication devices, etc., for brevity, the invention will be described by way of examples with respect to mobile phones, but it will be appreciated that the invention may be used with other electronic communication devices.

A Body Area Network, BAN, also referred to as a wireless body area network, WBAN or body sensor network, BSN, is a wireless network of communication devices using Body Coupled Communication, BCC. BAN enabled devices may be embedded inside the body, implants, may be surface-mounted on the body in a fixed position or may be accompanied devices which humans can touch or carry in different positions, in clothes, pockets, by hand or in various bags.

Body Area Network, BAN, standards such as IEEE's 802.15.6 or Sony's CCCC is enabling the possibilities for commercialized BAN devices. The first BAN enabled devices have its background in the medical area, as BCC is a communication standard optimized for low power devices and operation on, in or around the human body. BCC makes it possible to communicate with 2 m or less between the devices over the body in the frequency band 13-40 MHz.

Figure 1A:
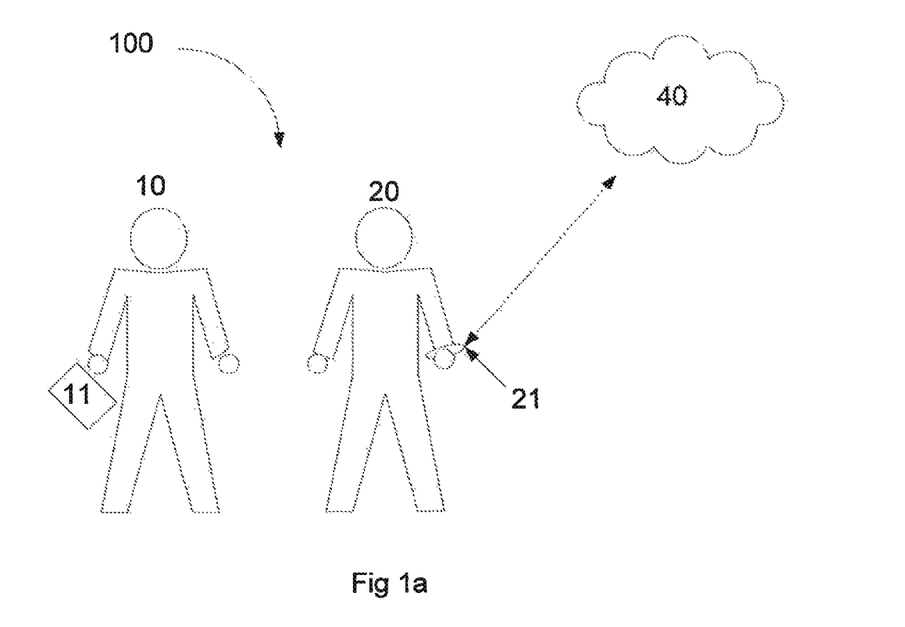
FIG. 1a-b shows a system comprising a BAN enabled capturing device and a BAN enabled communication device in one scenario of the present invention can be implemented.
Figure 1B:
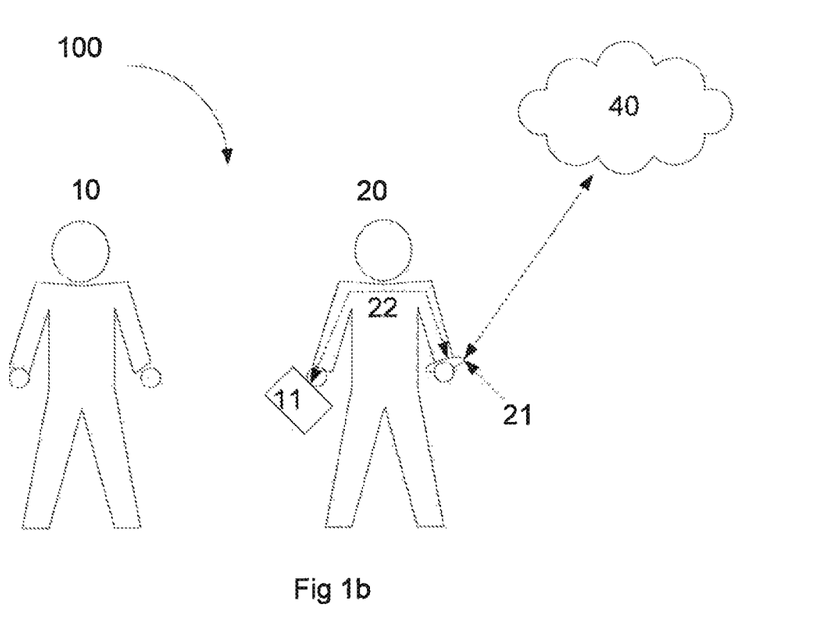
Figure 4:
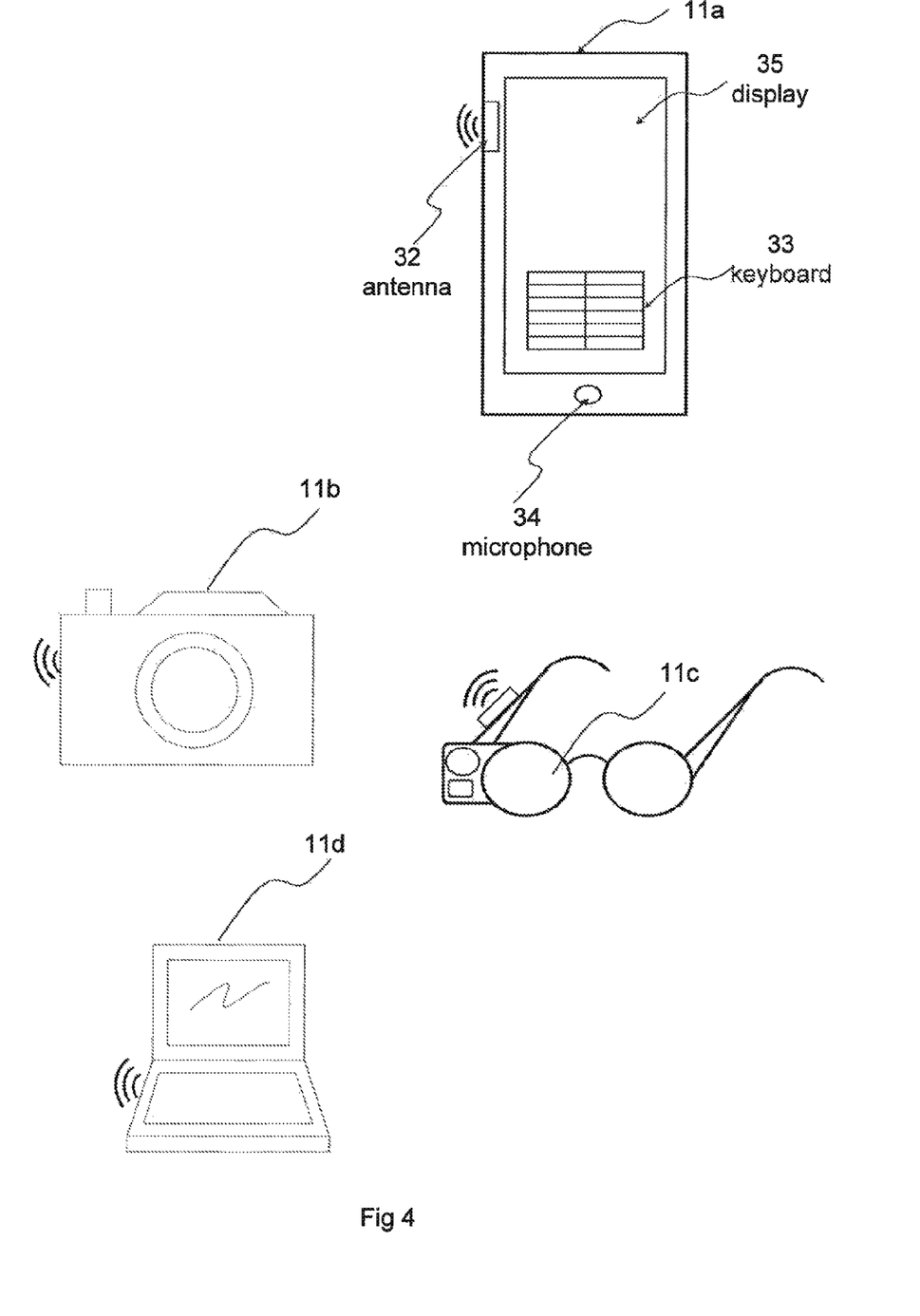
FIG. 4 shows exemplary embodiments of BAN enabled capturing devices according to the disclosure.

Referring in detail to the drawings, and initially to FIG. 1a-b, a BAN enabled media capturing device in accordance with an embodiment of the present invention is illustrated generally at 11. A BAN enabled media capturing device 11 in this application refers to any BAN enabled communication device configured to capturing media, such as pictures, film, sound etc., and to be touched by a user. Examples of such BAN enabled media capturing devices are shown in FIG. 4 e.g. a smartphone 11a, a camera 11b, googles 11c and a laptop 11d. Other examples of BAN enabled media capturing devices, not shown, are e.g. a media streaming device, an audio streaming device, a media service device, a tablet, a computer, a video conference device, a virtual reality device, a head-mounted display, a visor, a gaming console, a touch-enabled surface such as a table etc. The BAN enabled media capturing device 11, 11a, 11b, 11c, 11d, will be referred to below as a media capturing device 11.

Figure 3:
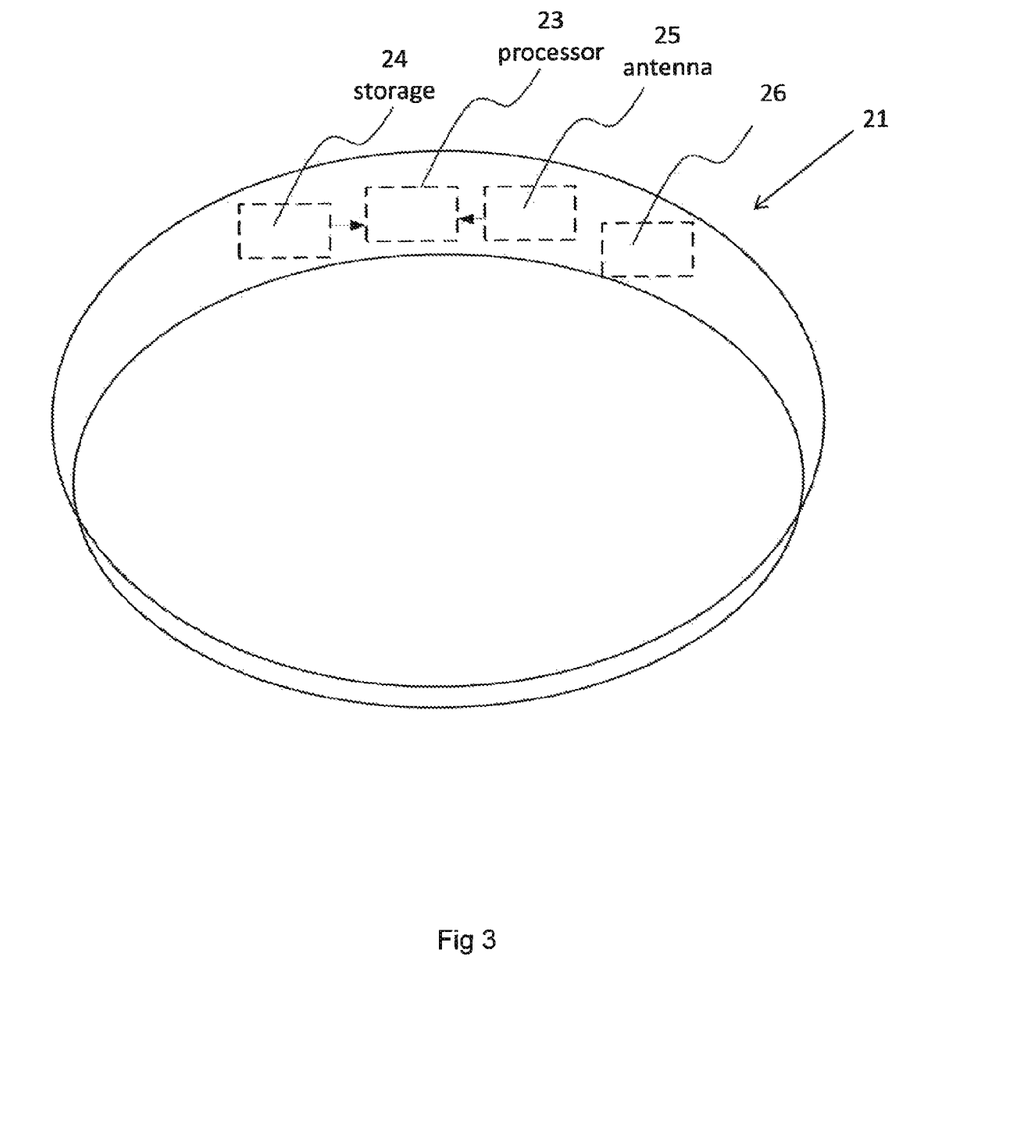
FIG. 3 shows a wearable BAN enabled communication device according to the disclosure.
Figure 5:
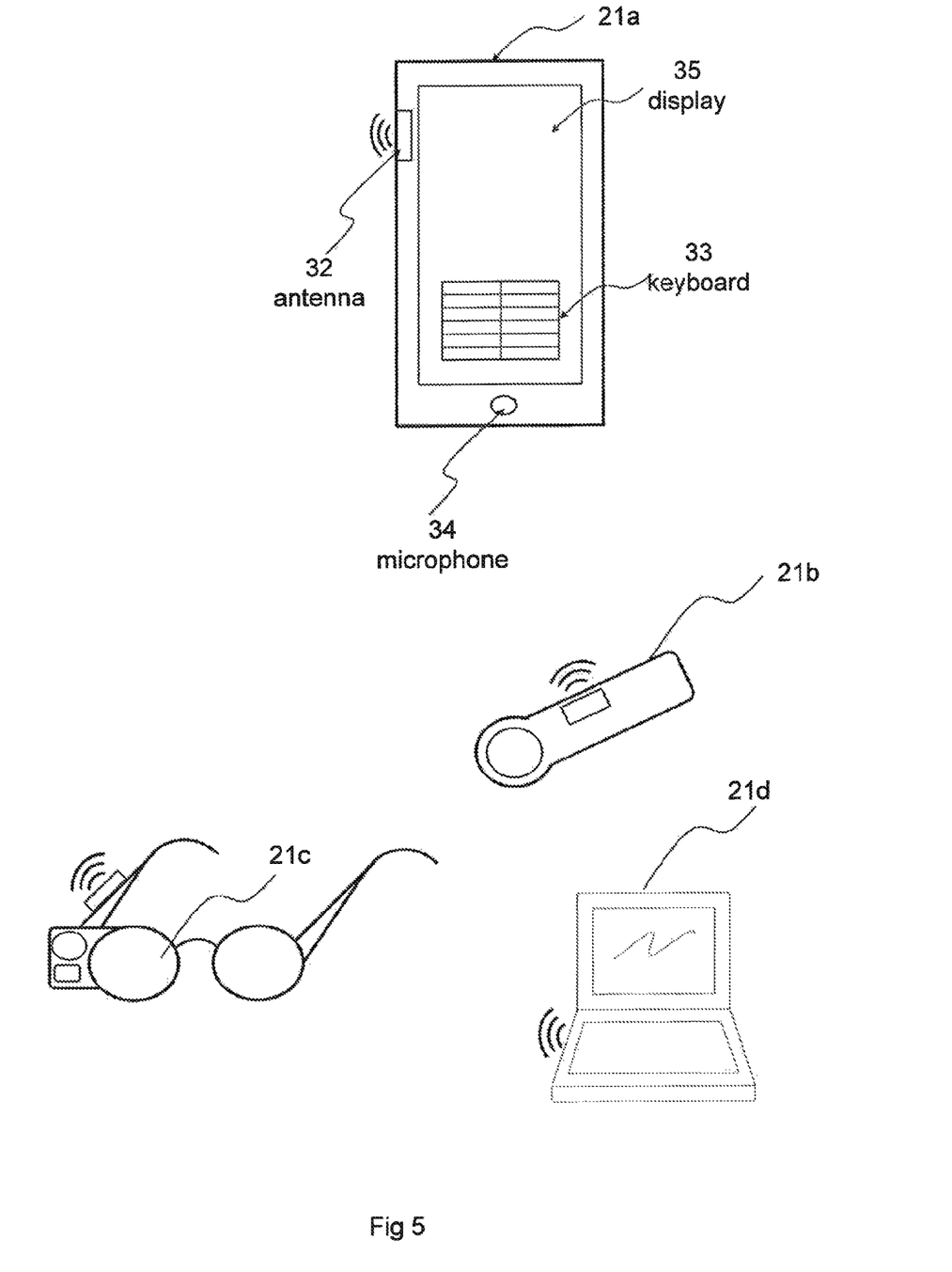
FIG. 5 shows exemplary embodiments of BAN enabled communication devices according to the disclosure.

A BAN enabled communication device in accordance with an embodiment of the present invention is illustrated generally at 21. A BAN enabled communication device 21 in this application refers to a wireless communication device configured to be worn or touched by a person. Examples of such BAN enabled devices are shown in FIGS. 3 and 5, as a wristlet 21a, a smartphone 21b, an in-ear hearing device 21b, a pair of googles 21c and a laptop 21d. The BAN enabled communication device 21, 21a, 21b, 21c, 21d, will be referred to below as a communication device 21.

In one embodiment a first user 10 is equipped with at least one BAN enabled media capturing device 11, such as a mobile phone with a media capturing unit, such as a camera, and a second user 20 is equipped with at least one BAN enabled communication device 21, such as a wristlet, as shown in FIG. 1a. A BAN connection, a BAN link 22, as shown in FIG. 1b, is established between the wristlet 21 and the mobile phone 11, when the second user 20 touches the mobile phone 11. The wristlet transmits media capturing settings to the mobile phone 11 over the BAN link 22. The settings comprise settings related to capturing media data, such as aperture, focus filters etc. Settings may also include settings for the User Interface (UI) of the capturing device or a media capturing application (app). Thus the user will get the feeling of using his/her own media capturing device, e.g. camera, when using a public device or a device belonging to another person.

In one embodiment, the settings are stored in second BAN enabled communication device, not shown, of the second user, e.g. a mobile phone. The first BAN enabled communication device 21 of the second user 20, e.g. a wristlet, is paired with the mobile phone of the second user, by an establishing BAN link, as described above. In one aspect, the settings are automatically transmitted to the wristlet, from the mobile phone, when the BAN-link is established. In one aspect, the user is asked if he/she would like to transmit the settings to the wristlet, before transmitting the settings to the wristlet. In one aspect, the stored information on the wristlet can be cleared as soon as the wristlet is removed from the user. In one embodiment, the settings may also be retrieved from a remote storage, such as cloud storage 40.

Figure 2:
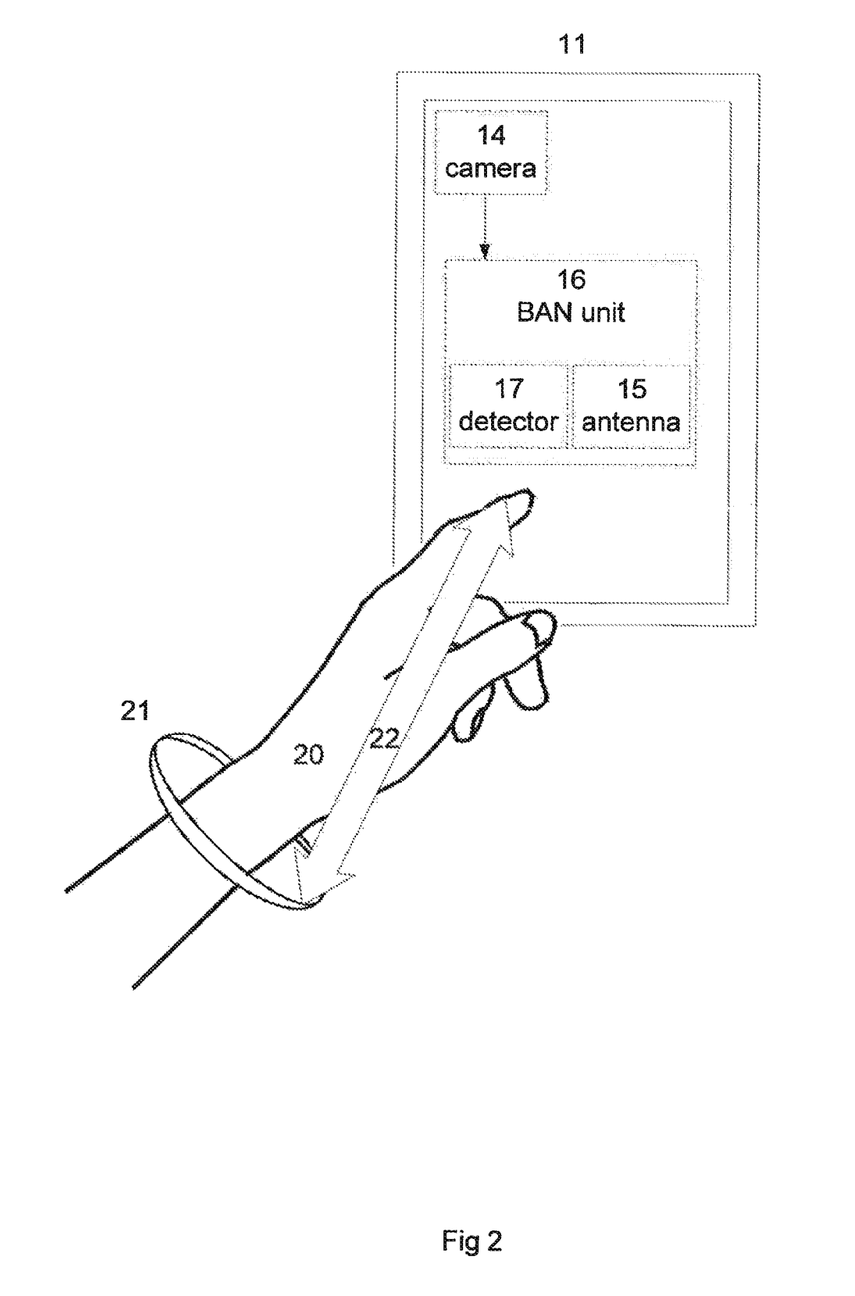
FIG. 2 illustrates a user wearing a communication device in one scenario of how the present invention can be implemented.

In one embodiment, shown in FIG. 2, the transmission of settings of a first communication device 21, e.g. a wristlet, may be performed according to a stored, predefined user configuration by touching at least one other BAN enabled communication device 11, e.g. a tablet, by the owner or user 20 of the wristlet 21. A RF signal is detected, indicating the presence of the BAN enabled media capturing device 11, thus confirming that BAN is available. Since the wristlet 21 is BAN enabled it will connect to the media capturing device 21 directly by using an established BAN-link 22. The user 20 may be asked by the wristlet 11 through a user interface of the wristlet or by interacting with the wristlet 11 in some other way, such as pressing a button, touching a touchpad etc. to confirm that connection with the media capturing device 11 should be established.

In one embodiment, as illustrated in FIGS. 1a and 1b, a second user 20, equipped with a BAN enabled communication device 21, e.g. a wristlet 21a comprising settings associated with capturing media data, would like to take a picture or a film clips on a BAN enabled media capturing device 11, e.g. smartphone 11a of a first user 10. The second user grabs the smartphone 11a and the wristlet 21a connects with the smartphone 11a by using an automatically established BAN link 22. The settings related to capturing media are automatically transmitted to the smartphone via the BAN link 22. The second user may now be able to capture pictures or favourite film clips by using the smartphone 11a of the first user 10. The captured media data is automatically transmitted to the wristlet via any wireless communication link e.g. BT, WLAN, the BAN link, etc.

In one embodiment a media capturing application is automatically transmitted to the capturing device 11, e.g. a smart phone, via the BAN link 22, when the second user 20 touches the smart phone of the first user 10. In one aspect the media application is automatically opened and displayed on the display of the capturing device. The second user may now be able to capture pictures or favourite film clips by using the capturing device 11a of the first user 10.

When the second user leaves the smartphone 11a back to the first user, the BAN link 22 is removed. If any data, such as pictures or film clips, has been saved on the smartphone, they may be stored temporary in an encrypted format, inaccessible without other users BAN, or be removed from the smartphone when the BAN link is removed.

In one embodiment, there is a BAN service provided on the smartphone 11a and when the smartphone 11a receives the settings the BAN service is configured to open a webview in the form of a pop-up window and a media capturing application is displayed on the pop-up window in the form of a bitmap icon. The BAN service is configured to read the links and accompanied username and password for the icon from the wristlet 21a. The BAN service opens the web interface of the chosen account and inserts the link together with the username/password. When the second user is finished capturing pictures he/she hands the smartphone back to the first user 10. The BAN link is removed, the user is logged out of the accounts and the activity/application. By using a media capturing application the users doesn't have to consider installing applications on other devices, the only requirement will be to have a web interface and access to internet.

Furthermore the metadata related to photographing may be managed. In one embodiment a second user picks up a capturing device, e.g. a camera, and then the photographer is identified by downloading metadata related to the identity of the user by using the BAN link. The photograph is then tagged with the name of the photographer. The favourite settings e.g. exposure/filters of the photographer may be downloaded. Specific tips based on the user's photo history may be identified and the user could be notified to e.g. walk closer to the subject, try different angles, try using longer exposure etc.

Furthermore user profiles may be managed, e.g. an owner of a capturing device, e.g. a camera, may give the camera to a friend/stranger, and then the access rights of the camera may be set to be used with 100% access within a specific time interval (minutes/seconds) or a within a specific location or as long as the friend/stranger using the capturing device is close to the owner of the capturing device.

Figure 6:
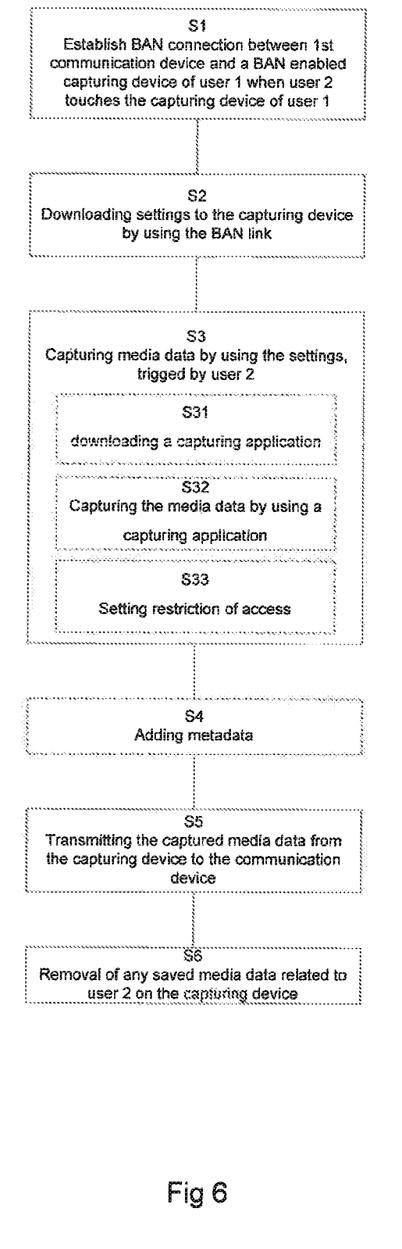
FIG. 6 shows a flow chart of the method according to the disclosure.

The method will now be described starting from FIG. 6 disclosing method steps, performed in a system including a BAN enabled media capturing device 11 equipped with a media capturing unit e.g. smart phone 11a or a camera 11b, of a first user 10 and a BAN enabled communication device 21 of a second user 20 e.g. a wristlet, clip, ring, necklace etc., to which the second user 20 has signed in with his/hers credentials. When the described steps are not dependent on each other, these steps may be implemented in any combination.

The first BAN enabled communication device 21 of the second user may be connected to a second BAN enabled communication device, not shown, of the second user through BCC, BLE, Wi-Fi, or may be connected to a cloud service 40 through BLE, Wi-Fi, for enabling transmission of media capturing settings and media data according to a stored, predefined user configuration associated with an identification data, user ID, of the first BAN enabled communication device 21.

In the first step a BAN link 22 is established S1, through a human body of the second user 20 that is wearing the BAN enabled communication device 21, 21a, between the BAN enabled communication device 21 and the BAN enabled media capturing device 11 when the second user 20 touches the capturing device 11. Thus BAN in the wristlet connects with BAN in the camera.

In the second step settings related to capturing media data and related to the second user are downloaded or transmitted S2 to the capturing device by using the established BAN link 22 when the second user 20 touches the capturing device 11.

In the third step media data is captured S3 with the capturing device 11 by using the downloaded settings wherein the capturing is triggered by the second user 20. In one aspect the step of capturing media data comprises downloading S31 a media capturing application to the media capturing device by using a communication network. The application may be downloaded from a second communication device of the second user, e.g. a smartphone or from the cloud service 40. The media data is then captured S32 by using the capturing application. In one aspect the capturing device triggers a mode for capturing and only the pictures captured by the second user is shown and may be edited.

In the fourth step metadata is added S4 metadata to the captured media data. In one aspect the metadata comprises any of identification information, e.g. User ID, of the second user, security information or a combination thereof. In one aspect the metadata comprises any of time, location or a combination thereof.

In the fifth step the capture media data is transmitted S5 from the capturing device 11 to the communication device 21 by using a communication network, such as BT, WLAN, BAN etc. In one aspect the capturing device connects to the cloud service 40, an external server, wristlet, phone etc. where the photo album account of the second user is positioned and transmits the captured media data directly without transmitting through the communication device 21. In one aspect each image capture with the capturing device is sent directly to the cloud etc. or temporarily stored, encrypted or not, in the capturing device for being sent to the cloud etc. when the capturing device connects to the cloud etc.

The settings comprise media capture history related to the second user, where the purpose is to enhance the process of capturing media.

The media data is any of an image, a film, sound or a combination thereof.

In one further step setting restriction of access S33 is set to the capturing device, such as only capturing specific motives of images e.g. landscape motives, only be used nearby the first user 10 e.g. restrict access within specific area, restrict access for a specific time interval e.g. only for 1 hour.

In one further step when the second user stops touching the capturing device, e.g. leave the device on a table, the BAN link automatically removes.

FIGS. 2 and 4 shows a BAN enabled capturing device 11, 11a, 11b, 11c, 11d which now will be described in further detail, configured for capturing media data. The BAN enabled capturing device may be any wireless communication device equipped with a media capturing unit 14, e.g. a camera unit, and a tablet 11 is shown only as an exemplary object. The BAN enabled capturing device is equipped with BAN electronic module 16. The electronic module may be designed as touchable area on the BAN enabled capturing device or may be designed as a tag or pod to be permanently attached to the capturing device or to be removable from the capturing device. The BAN electronic module comprises a detector unit 17 configured for detecting a RF signal which indicates the presence of another BAN enabled communication device.

In one embodiment the detector unit comprises a capacitive touch system. The capacitive sensor system has low power consumption, which is less than 30 microampere, when the BAN enabled communication device is touched. The sensitive range may be set to the range of 20-30 mm. The capacitive sensor system is always active. As soon as the user, who is touching or wearing a BAN enabled communication device, touches or is close to another BAN enabled communication device the detector unit starts to sense the presence of the other BAN enabled communication device.

The BAN electronic module 16 further comprises a radio communication interface 15 configured to communicate with another BAN enabled communication device by using BAN.

The BAN electronic module 16 further comprises a processor 13. The processor is configured to execute the method according to the disclosure. The processor is typically a processing circuitry constituted by any suitable Central Processing Unit, CPU, microcontroller, Digital Signal Processor, DPS, etc. configured for executing computer code, such as a computer program implementing the proposed method. One example is that the computer code is an application, which may be downloaded from an external server. However, the method may as well be hardware implemented or a combination of hardware and software. The computer program may be stored in a memory, MEM, not shown. The memory can be any combination of a Random access Memory, RAM, and a Read only Memory, ROM. The memory may also comprise persistent storage, which for example, can be any single one or combination of magnetic memory, optical memory, or solid state memory or even remotely mounted memory.

The processor is configured to broadcast a signal, indicating ability to connect and/or transmit settings related to capturing media data, when the detector unit 17 detects the presence of another BAN enabled communication device.

In one embodiment, the processor 13 of the BAN electronic module 16 is configured to provide communication between the tablet and another BAN enabled communication device 21 e.g. a wristlet, via a BAN link 23 through a human body of the user 20 wearing the wristlet 21, when the user of the wristlet touches the tablet 11.

In one embodiment, the processor 13 is configured to receive settings related to capturing media data from the wristlet 21, via the BAN link 22, when the user 20 touches the tablet 11.

In one aspect the processor is configured to open a Graphical User Interface, GUI, represented by a pop-up window, on a display screen 35 of the tablet 11 for displaying the captured media data.

In one aspect the settings comprises at least one graphical element representing a link to an media data account of the user, e.g. a photo album, and wherein the processor 13 is configured to receive credential data, such as username and password, for permitting access to the accounts, from the wristlet 21, when the user activates the graphical element, e.g. touching the displayed bitmap icons on the pop-up window. In one embodiment, the tablet comprises a sensor configured for detecting when the user stops touching the tablet 11. The processor 13 is configured to shut down said GUI within a predetermined time interval or immediately in response to detecting when the user stops touching the tablet 11.

In one embodiment the processor 13 is configured to remove any saved data on the tablet in response to detecting the when the user stops touching the tablet 11.

The capturing device 11, as shown in FIG. 4, further comprises a wireless communication interface (i/f) 32 arranged for wireless communication with cellular communication systems and/or other wireless communication systems. The wireless communication interface may be adapted to communicate over one or several radio access technologies. If several technologies are supported, the access point typically comprises several communication interfaces, e.g. one WLAN communication interface and one cellular communication interface. The communication interface is e.g. adapted to download a computer program for executing the proposed methods or access a data base comprising device specific information.

The capturing device 11 further may comprises an input unit 33, such as a keyboard and a microphone 34.

FIGS. 1 to 5 shows a BAN enabled communication device 21, 21a, 21b, 21c, 21d which now will be described in further detail. A BAN enabled communication device 11 may be any BAN any communication device and a wristlet is shown only as an exemplary object.

In one embodiment the BAN enabled communication device 21, e.g. a wristlet, is configured for receiving media data from a BAN enabled media capturing device 11, e.g. a tablet. The wristlet comprises a control application 26, such as a web application or a map, comprising the settings related to capturing media data. The wristlet comprises a processor 23 configured to provide communication between the wristlet 11 and the tablet 21 via a BAN link 22 through the human body of the user wearing the wristlet 11, when the user touches the tablet 21. The processor 17 is configured to transmit the settings comprised in the control application 26 via the BAN link 22 to the tablet 21 when the user touches the tablet 21.

In one embodiment the settings comprises at least one graphical element, such as an icon text, button or another GUI element, which is a reference in an electronic document that lets a user get access to storage account of captured media data.

In one embodiment the processor is configured to transmit authentication data or credential data such as username and password to the tablet for permitting access to the account when said user activates the graphical element. The graphical element is activated when the user touches or selects the graphical element.

In one embodiment the processor is configured to remove any saved data on the wristlet in response to detecting a removal of the wristlet from the user.

FIG. 1a-b show a system 100 configured for capturing media data. The system comprises a BAN enabled media capturing device 11 and a BAN enabled communication device 21.

In one embodiment, the BAN enabled capturing device 11 is a capturing device 11, 11a, 11b, 11c, 11d, 11e as described in further detail above.

In one embodiment, the BAN enabled communication device 21 is communication device 21, 21a, 21b, 21c, 21d, as described in further detail above.

Embodiments and aspects are disclosed in the following items:

Item 1. A method for capturing media data using an Body Area Network, BAN, wherein said BAN comprises a BAN enabled media capturing device associated with a first user and at least one BAN enabled communication device associated with a second user, wherein said method comprising:
 establishing a BAN link through the body of said second user between said capturing device and said communication device, when said second user touches said capturing device;
 downloading settings, related to capturing media data and related to said second user, to said capturing device by using said established BAN link; and
 capturing media data with said capturing device by using said downloaded settings wherein the capturing is triggered by the second user.

Item 2. The method according to item 1, wherein said method comprising transmitting said captured media data from said capturing device to said communication device by using a communication network.

Item 3. The method according to any of item 1 and 2, wherein said downloaded settings comprises media capture history related to said second user.

Item 4. The method according to item 1 and 2, wherein said media data is any of an image, a film, sound or a combination thereof.

Item 5. The method according to item 1, wherein capturing media data comprising:
 downloading a media capturing application to said media capturing device by using a communication network; and
 capturing said media data by activating an instance of said capturing application.

Item 6. The method according any of the previous items, wherein said method comprising adding metadata to said captured media data.

Item 7. The method according to item 6, wherein said metadata comprising identification information of said second user.

Item 8. The method according to item 6, wherein said metadata comprising security information.

Item 9. The method according to item 6, wherein said metadata comprising any of time, location or a combination thereof.

Item 10. The method according to any of the previous items, wherein said method comprising setting restriction of access to said capturing device.

Item 11. A system for capturing media data using a Body Area Network, BAN, wherein said system comprises a BAN enabled media capturing device associated with a first user and at least one BAN enabled communication device associated with a second user wherein said media capturing device comprising:
 a processing circuitry configured to:
  establishing a BAN link through the body of said second user between said capturing device and said communication device, when said second user touches said capturing device; and
  downloading settings, related to capturing media data and related to said second user, to said capturing device by using said established BAN link,
 a media capturing unit configured to capturing media data by using said downloaded settings wherein the capturing is triggered by said second user,
wherein said communication device comprising:
 a processing circuitry configured to:
  establishing said BAN link through the body of said second user between said communication device and said capturing device, when said second user touches said capturing device; and
  transmitting settings, related to capturing media data and related to said second user, to said capturing device by using said established BAN link.

Item 12. The system according to item 11, wherein said processing circuitry of said capturing device is configured to transmit said captured media data from said capturing device to said communication device by using a communication network.

Item 13. The system according to item 11 or 12, wherein said settings comprise media capture history related to said second user.

Item 14. The system according to item 11 or 12, wherein said media data is any of an image, a film, sound or a combination thereof.

Item 15. The system according to any of items 11-14, wherein said processing circuitry of said capturing device is configured to downloading a media capturing application to said media capturing device by using a communication network and said media capturing unit is configured to capturing said media data by using said capturing application.

Item 16. The system according to item 11, wherein said processing circuitry of said capturing device is configured to adding metadata to said captured media data.

Item 17. The system according to item 16, wherein said metadata comprising identification information of said second user.

Item 18. The system according to item 16, wherein said metadata comprising security information.

Item 19. The system according to item 16, wherein said metadata comprising any of time, location or a combination thereof.

Item 20. The system according to any of items 11-19, wherein said processing circuitry is configured to setting restriction of access to said capturing device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

What is claimed is:

1. A method for capturing image data and storing the image data to an account corresponding to a second user using Body Area Network (BAN), wherein said BAN comprises a BAN enabled image capturing device associated with a first user and at least one BAN enabled communication device associated with a second user, said method comprising:
    establishing a BAN link through the body of said second user between said image capturing device and said communication device, when said second user touches said image capturing device;
    downloading settings, related to capturing media data and related to said second user, to said capturing device, wherein said settings are downloaded over said established BAN link; and
    capturing image data with said image capturing device the capturing triggered by the second user; and
    automatically signing out of the image capturing device upon the second user no longer touching the image capturing device.

2. The method according to claim 1, wherein said transferring said captured image data from said capturing device to said communication device includes using a communication network.

3. The method according to claim 1, wherein said downloaded settings comprises media capture history related to said second user.

4. The method according to claim 1, wherein capturing image data comprising:
    downloading a media capturing application to said image capturing device by using a communication network; and
    capturing said image data by activating an instance of said capturing application.

5. The method according to claim 1, wherein said method comprising:
    adding metadata to said captured image data.

6. The method according to claim 5, wherein said metadata comprising identification information of said second user.

7. The method according to claim 5, wherein said metadata comprising security information.

8. The method according to claim 5, wherein said metadata comprising any of time, location or a combination thereof.

9. The method according to claim 1, wherein said method comprising:
    setting restriction of access to said capturing device.

10. A system for capturing image data and storing the image data to an account corresponding to a second user using a Body Area Network (BAN), wherein said system comprises a BAN enabled image capturing device associated with a first user and at least one BAN enabled communication device associated with a second user wherein said image capturing device comprising:
    a processing circuitry configured to:
        i. establishing a BAN link through the body of said second user between said image capturing device and said communication device, when said second user touches said image capturing device; and
        ii. downloading settings, related to capturing media data and related to said second user, to said capturing device, wherein said settings are downloaded over said established BAN link,
    an image capturing unit configured to capturing image data, wherein the capturing is triggered by said second user, wherein said communication device comprising:
    a processing circuitry configured to:
        i. establishing said BAN link through the body of said second user between said communication device and said image capturing device, when said second user touches said capturing device; and
        ii. automatically signing out of the image capturing device upon the second user no longer touching the image capturing device.

11. The system according to claim 10, wherein said processing circuitry of said image capturing device is configured to transfer said captured image data from said image capturing device to said communication device by using a communication network.

12. The system according to claim 10, wherein said settings comprise media capture history related to said second user.

13. The system according to claim 10, wherein said processing circuitry of said image capturing device is configured to downloading a media capturing application to said image capturing device by using a communication network and said image capturing unit is configured to capturing said image data by using said capturing application.

14. The system according to claim 10, wherein said processing circuitry of said image capturing device is configured to adding metadata to said captured image data.

15. The system according to claim 14, wherein said metadata comprising identification information of said second user.

16. The system according to claim 14, wherein said metadata comprising security information.

17. The system according to claim 14, wherein said metadata comprising any of time, location or a combination thereof.

18. The system according to claim 10, wherein said processing circuitry is configured to setting restriction of access to said image capturing device.

19. The method according to claim 10, wherein the processing circuitry of the communication device is configured to transfer the captured image data from the image capturing device to the account of the second user.

20. The method according to claim 1, further comprising transferring the captured image data to the account of the second user.

\* \* \* \* \*

UNITED STATES PATENT AND TRADEMARK OFFICE
CERTIFICATE OF CORRECTION

PATENT NO. : 9,712,256 B2
APPLICATION NO. : 14/612693
DATED : July 18, 2017
INVENTOR(S) : Rodzevski et al.

It is certified that error appears in the above-identified patent and that said Letters Patent is hereby corrected as shown below:

On the Title Page

Assignee reads, "Sony Corporation" should read "Sony Mobile Communications Inc"

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*